(12) United States Patent
Jacobine et al.

(10) Patent No.: US 6,562,881 B2
(45) Date of Patent: May 13, 2003

(54) LIQUIFIED POLYOLS, URETHANE ACRYLATE RESINS PREPARED THEREWITH AND CURABLE COMPOSITIONS EMPLOYING SUCH RESINS

(75) Inventors: Anthony Jacobine, Meriden, CT (US); David Glaser, New Britain, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/867,986

(22) Filed: May 30, 2001

(65) Prior Publication Data

US 2003/0060588 A1 Mar. 27, 2003

(51) Int. Cl.$^7$ ............................................. C08G 18/62
(52) U.S. Cl. ............................ 522/96; 522/97; 528/59; 528/79; 526/301
(58) Field of Search ..................... 522/96, 97; 528/79, 528/59; 526/301

(56) References Cited

U.S. PATENT DOCUMENTS

| | | | |
|---|---|---|---|
| 3,218,305 A | 11/1965 | Krieble | 260/89.5 |
| 4,180,640 A | 12/1979 | Melody | 526/323.1 |
| 4,287,330 A | 9/1981 | Rich | 526/270 |
| 4,321,349 A | 3/1982 | Rich | 526/270 |
| 5,998,568 A | 12/1999 | Nava et al. | 528/275 |

FOREIGN PATENT DOCUMENTS

| | | | |
|---|---|---|---|
| JP | 02022371 | * | 1/1990 |
| JP | 2000034441 | * | 2/2000 |
| WO | 00/40663 | | 7/2000 |

OTHER PUBLICATIONS

Chem Abstract 110: 193978 of JP 63235323 Mar. 1987.
Chem Abstract 127:266554 of JP 09216845 Aug. 1997.
Chem Abstract 91:6531 of JP 54016540 Feb. 1979.
Chem Abstract 86: 173227 of BE 835496 Nov. 1975.
Chem Abstract 86:157191 of BE 835824 Nov. 1975.

* cited by examiner

*Primary Examiner*—Rachel Gorr
(74) *Attorney, Agent, or Firm*—Steven C. Bauman

(57) ABSTRACT

An alkoxylate adduct of a polyol. The polyol is an amorphous diol having a melting point above about 100° C. The alkoxylate is propylene oxide, butylene oxide, a mixture of propylene oxide and butylene oxide or a mixture of one or both of propylene oxide and butylene oxide with up to 50 mole % of ethylene oxide. The first polyol has an average of from about 1 to about 5 units of alkoxylate per mole of said amorphous diol. The adduct is useful in preparing urethane (meth)acrylate capped resins and compositions thereof. Resins prepared from such adducts have better manufacturing and solubility properties while retaining similar physical properties to resins prepared from the unadducted diol. The adduct may be for instance a propoxylate of hydrogenated bisphenol A having an average of from 1.5 to 3.5 moles of PO per mole of hydrogenated bisphenol A.

27 Claims, No Drawings

LIQUIFIED POLYOLS, URETHANE ACRYLATE RESINS PREPARED THEREWITH AND CURABLE COMPOSITIONS EMPLOYING SUCH RESINS

FIELD OF THE INVENTION

The present invention pertains to novel urethane (meth)acrylate resins, polyols used to prepare such resins and to free-radically curable compositions employing such resins.

BACKGROUND OF THE INVENTION

Hydrogenated bisphenol A (HBPA) has been used in the preparation of (meth)acrylate capped segmented urethane block copolymers. HBPA is somewhat unique in its role as a urethane extender in preparation of block copolymer urethane acrylate resins. HBPA gives rigid urethane segments that have high temperature transitions due to the high melting point of HBPA (165–175° C.) and these segments are amorphous. These characteristics are believed to contribute heavily to the toughness associated with adhesives derived from such block copolymers.

There are, however, significant drawbacks associated with the use of HBPA in the preparation of segmented urethanes. One such drawback is the fact that HBPA is a high melting solid, it is difficult to handle solid materials in a plant environment and furthermore the reaction between liquids and solids is difficult to moderate. In commercial resin using HBPA, the material is often added as a solid in many portions (in some cases up to 10 additions) to moderate and control the reaction which is oftentimes carried out in a methacrylate solvent monomer. Great care must be exercised to control the temperature so that the solvent monomer does not polymerize but the prepolymer formation is driven to completion so that no solid material is left unreacted.

An additional problem associated with the use of HBPA in the preparation of urethane prepolymers is the fact that the rigid segment prepared by the reaction of HBPA and some diisocyanates, for instance isophorone diisocyanate, is not sufficiently soluble in many (meth)acrylic solvent monomers. Block materials derived from this type of segment often cannot be prepared in a sufficiently high concentration (desirably 50–75% block by weight) to make them useful for formulations. Therefore preparation of modern low color urethanes for radiation curable applications cannot be attained using HBPA as a urethane extender, thus forcing a compromise in either adhesive properties associated with toughened behavior or color development.

Similar problems exist when using other amorphous diols having a high melting point to prepare urethane(meth)acrylate oligomers.

It would be desirable to have a urethane extender diol which provided the property advantages of a high melting point diol with reduced processing problems and improved block resin solubility.

U.S. Pat. No. 5,998,568 describes a alkoxylated diol resin produced by reacting a polyfunctional alcohol, such as cyclohexane dimethanol with a carbonate such as propylene carbonate or 1,2-butylene carbonate. The alkoxylated resin is used in preparing a polyester resin.

Ethoxylates of Hydrogenated bisphenol A or similar diols are known with CA Registry Nos. 195971-69-8, 195971-66-5, and 62580-01-2. A propoxylated hydrogenated bisphenol is known with CA Registry No. 70640-72-1.

Hydrogenated bisphenol A—propylene oxide adduct is mentioned in Chem Abst 110:193978 as a precursor material used in preparing an epoxy resin.

Hydroxycyclohexylalkane polyoxyalkylene compounds are described in Chem Abst 127:266554 as plating bath surfactants.

SUMMARY OF THE INVENTION

The invention is based on the discovery that low level $C_3$–$C_4$ alkoxylation of an amorphous diol gives diol products which have improved processability in forming urethane (meth)acrylate resins without substantial loss of desired physical properties.

In one aspect the invention is a urethane (meth)acrylate resin, obtained by reaction of a polyol component and a polyisocyanate component wherein the polyol component comprises
- a first polyol which is an alkoxylate of an amorphous diol having a melting point above about 100° C.;
- the alkoxylate is an adduct of propylene oxide, butylene oxide, a mixture of propylene oxide and butylene oxide or a mixture of one or both of propylene oxide and butylene oxide with up to 50 mole % of ethylene oxide, and
- the first polyol has an average of from about 1 to about 5 units of alkoxylate per mole of said amorphous diol. The resin is suitably end-capped by reaction of isocyanate groups of the diisocyanate with a hydroxyalkyl (meth)acrylate.

The urethane (meth)acrylate resin may be a block resin oligomer comprising hard segments and soft segments, with the hard segments comprising residues derived from the first polyol and the polyisocyanate and the soft segments comprising residues derived from a co-polyol, suitably an aliphatic diol or triol having a number average molecular weight of from 700 to about 5000.

In a further aspect, the invention comprises free radically curable compositions comprising a resin of the invention. The composition may include additional (meth)acrylate compounds and/or an free-radical initiator, for instance an anaerobic initiator or a photoinitiator. Cured products of such compositions and assemblies adhesively bonded by such cured products are still further aspects of the invention.

The alkoxylated diols as described above and their method of preparation comprise still further aspects of the invention.

These and other aspects of the invention are set forth in the following detailed description and in the claims.

DETAILED DESCRIPTION OF THE INVENTION

Alkoxylated Amorphous Diol

In one aspect the invention is an alkoxylate of an amorphous diol having a melting point above about 100° C. The alkoxylate is an adduct of propylene oxide, butylene oxide, a mixture of propylene oxide and butylene oxide or a mixture of one or both of propylene oxide and butylene oxide with up to 50 mole % of ethylene oxide. The polyol has an average of from about 1 to about 5 units of alkoxylate per mole of said amorphous diol. For ethylene oxide, propylene oxide and butylene oxide, respectively the individual alkoxylate units added to the diol structure may be represented by the substructure formulas:

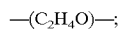

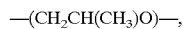

and

The alkoxylate of the amorphous diol so produced is the first polyol which is used in the preparation of the inventive (meth)acrylate resins.

The alkoxylated amorphous diol is prepared by alkoxylation of the commercial grade amorphous diol using propylene oxide, butylene oxide or mixtures thereof or with up to 50 mole % ethylene oxide. The reaction is suitably carried out neat in the melt at an elevated pressure, suitably from about 25 psi (172 kPa) to about 200 psi (1379 kPa), preferably about 50 psi (345 kPa) to about 100 psi (689 kPa). The reaction is catalyzed with a base such as sodium hydroxide, potassium hydroxide, or an alkali alkoxide. A suitable catalytic amount is from about 0.05 to about 1 weight % of the base catalyst, more preferably about 0.1 to about 0.5% by weight.

The amorphous high melting point diol which is alkoxylated has a melting point above 100° C. A preferred such diol is commercial grade hydrogenated bisphenol A. Other examples of such diols include cyclohexane dimethanol, and hydrogenated dihydroxynaphthalenes. The invention is especially advantageous with amorphous diols which have even higher melting points about 125° C. or higher, and even more so for those having melting points of about 145° C. or higher.

Alkoxylation in this manner will gradually diminish the hard segment high modulus and tensile strength properties and increase elongation properties, which characterize resins made from amorphous high melting diols such as HBPA. Consequently, as a practical matter the a maximum of no more than an average of 5 alkoxylate units per molecule is recommended, more preferably no more than about 3.5 alkoxylate units per molecule. For substantial improvement in resin manufacturing a minimum average of about 1.5 alkoxylate units is recommended. Most preferably the average number of alkoxylate units per molecule of amorphous high melting point diol will be from about 2 to about 3.

In a preferred example, hydrogenated bisphenol A (HBPA) in the melt (165–175° C.) is propoxylated with between 1.5 and 3.5 moles of propylene oxide per mole of diol at 50–100 psi pressure, suitably maintained with a pressurized inert gas such as dry nitrogen, the reaction being catalyzed with potassium hydroxide (about 0.25% by weight). The resulting reaction gives a clear solution, which is a mixture of products and isomers consisting of alkoxylated oligomers (propoxylated HBPA) and unreacted dissolved HBPA (approximately 10–42%). Residual catalyst may be removed by treatment with a clay such as MAGNESOL™ Polysorb 30/40 or a mixture thereof with a filter aid such as CELITE™ 503 diatomaceous earth to give a urethane grade diol.

The degree of propoxylation and the general oligomer mix is readily controlled by the amount of propylene oxide added to the reaction mixture. Propoxylation of HBPA by this methodology gives materials that are liquid at room temperature at about 1 PO unit or higher per molecule. Preferred materials are prepared by addition of an average of about 1.5 to about 3.5 PO units per molecule of HBPA, such materials ranging in viscosity at 25° C. from 2,300,000 mPaAs (1.5 PO) to 23,000 mPaAs (3.53 PO). These materials contain only secondary hydroxyl groups. There is a steep temperature dependence of viscosity. Propoxylated HBPA (1 PO) has a viscosity that is too high to measure at 25° C., and at 70° C. has a viscosity of 5,280 mPa·s. Propoxylated HBPA prepared by this methodology gives a product mixture that is highly soluble in conventional acrylic and methacrylic monomers in amounts up to about 75% by weight. The secondary hydroxyl groups in the product mixtures of propoxylated HBPA appear to be highly reactive toward both aliphatic and aromatic isocyanate groups compared to the secondary hydroxyl groups in solid HBPA.

Urethane Acrylate Resins

The alkoxylated amorphous diol is used to prepare a urethane acrylate resin of the invention, suitably by a sequenced reaction utilizing one or more polyisocyanates, optionally one or more additional polyols, and a hydroxyalkyl (meth)acrylate end-capper. Desirably the reaction is sequenced and additional polyols are provided so as to produce a resin having alternating sequences of hard and soft segments between urethane (meth)acrylate capped ends.

The alkoxylated amorphous diol may be used in the preparation of hard segments in an oligomeric polyurethane block copolymer characterized by both hard and soft segments. Co-polyols which may be employed to provide soft segments in the manufacture of the urethane (meth)acrylate resins of the invention are oligomeric aliphatic diols or triols having a number average molecular weight of from about 700 to about 5000, for instance about 1000 to about 5000, preferably from about 1800 to about 2800. Preferred oligomeric aliphatic diols and triols are polyoxypropylene triols, polyTHF diols, polycaprolactone/polyTHF block copolymers, and polycaprolactone diols.

The polyoxypropylene triols which may be employed in the manufacture of the urethane (meth)acrylate resins utilized in the inventive compositions may be derived from glycerol, trimethylolpropane or another triol which has been alkoxylated with propylene glycol to give a product having a number average molecular weight as specified above. Suitable such polyoxypropylene triols are PLURACOL™ TP-2540, and PLURACOL™ EP 1437, from BASF, which are respectively, a trimethylol started polyoxypropylene triol having a number average molecular weight of about 2450 and a glycerol started polyoxypropylene triol having a number average molecular weight of approximately 2500.

The polyTHF diols which may be employed in the manufacture of the urethane (meth)acrylate resins utilized in the inventive compositions are also known as a polytetramethylene oxide. The diol is typically produced by a ring opening polymerization of tetrahydrofuran (THF). A suitable such polyTHF diol is POLYMEG™ 2000, sold by Penn Specialties and having a number average molecular weight of approximately 2000.

The polycaprolactone-polyTHF block copolymers which may be employed in the manufacture of the urethane (meth)acrylate resins utilized in the inventive compositions may be polycaprolactone-co-polyTHF-polycaprolactone diols of the specified molecular weights. A suitable example is CAPA-720, sold by Solvay-Interox.

Polycaprolactone diols within the specified molecular weight range also may be employed in the manufacture of the urethane (meth)acrylate resins utilized in the inventive compositions.

The polyisocyanates used to prepare the inventive resins are preferably compounds or mixtures having an average of about 2 to about 2.5 isocyanate groups per molecule and may be aliphatic or aromatic. Preferred polyisocyanates are aromatic or aliphatic diisocyanates. Examples of suitable aliphatic diisocyanates include isophorone diisocyanate (IPDI), methylene-bis-cyclohexane diisocyanate (HMDI or $H_{12}$MDI), 1,6-hexane diisocyanate, 4,4'-diphenylmethane diisocyanate (MDI), 2,4- and 2,6-toluene diisocyanate (TDI), ditolyl diisocyanate (TODI), 1,5-naphthalene diisocyanate, 4,4-dibenzyl diisocyanate, C or p-xylene diisocyanate, 1,3-phenylene diisocyanate, 1,6- hexamethylene diisocyanate, isophorone diisocyanate, 1,4-cyclohexane diisocyanate. Oligomeric polyisocyanates may suitably be used. Isophorone diisocyanate and toluene diisocyanate are examples of preferred polyisocyanates.

The hydroxyalkyl (meth)acrylate used as end-capper in the production of the urethane acrylate resins of the invention may be, e.g., hydroxyethyl methacrylate, hydroxypropyl methacrylate, hydroxybutyl methacrylate, hydroxyethyl acrylate, hydroxypropyl acrylate or hydroxybutyl acrylate. Acrylates are preferred, especially hydroxyethyl acrylate.

The inventive resins suitably prepared by reacting the diisocyanate with the high melting amorphous diol, at a ratio of about 2 or more isocyanate groups of the diisocyanate per hydroxyl group of the diol. The remaining isocyanate groups may then be reacted with a suitable hydroxyalkyl (meth)acrylate compound to produce the acrylated oligomer. Block resins may be prepared in a 3-step reaction in a soft-segment polyol is added between the amorphous high melting point diol and the hydroxyalkyl (meth)acrylate. Other sequences are also possible, for instance starting with reaction of a soft segment diol, followed by the amorphous diol and then the hydroxyalkyl (meth)acrylate. Acrylate functional isocyanate intermediates may be prepared from the hydroxyalkyl (meth)acrylate and a diisocyanate, which are then used as capping agents for the amorphous diol or a hydroxy functional reaction product of the amorphous diol, a polyisocyanate and a soft-segment diol.

Curable Formulations

The inventive resin is suitably employed in a free-radically curable formulation in amounts of from about 2 to about 98% by weight, preferably about 10 to about 65, more preferably about 15 to about 50% by weight.

The inventive resins will typically be prepared using one or more (meth) acrylate monomer compounds as solvent. Such solvents monomers, when employed, are not removed. The solvent identity and amount may be chosen such that no further monomers need be added. In any case, curable formulations of the invention may, and typically will, include at least one other (meth)acrylate ester compound. Most formulations will desirably contain several such compounds. Such compounds include a wide variety of materials represented by $H_2C=CR^1CO_2R^2$, where $R^1$ may be hydrogen, halogen or alkyl of 1 to about 4 carbon atoms, and $R^2$ may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like. These second (meth)acrylate ester compounds are suitably present collectively an amount from about 2% to about 95% by weight of the composition.

More specific (meth)acrylate compounds which may be additionally included in the inventive adhesives include polyethylene glycol di(meth)acrylates, bisphenol-A di(meth)acrylates, such as ethoxylated bisphenol-A methacrylate ("EBIPMA") and tetrahydrofuran (meth)acrylates and di(meth)acrylates, hydroxypropyl (meth)acrylate, hexanediol di(meth)acrylates, trimethylol propane tri(meth) acrylate, ethoxylated trimethylol propane tri(meth)acrylates, (meth)acrylated polyesters and an acrylate ester corresponding to the structure shown below:

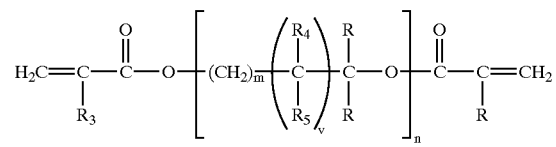

where $R^3$ may be selected from hydrogen, alkyl of 1 to about 4 carbon atoms, hydroxyalkyl of 1 to about 4 carbon atoms or

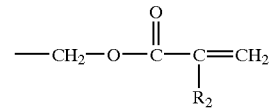

$R^4$ may be selected from hydrogen, halogen, and alkyl of 1 to about 4 carbon atoms;

$R^5$ may be selected from hydrogen, hydroxy and

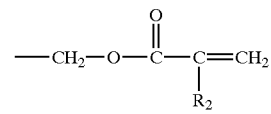

m is an integer equal to at least 1, e.g., from 1 to about 8 or higher, for instance, from 1 to about 4;

n is an integer equal to at least 1, e.g., 1 to about 20 or more; and v is 0 or 1.

Of course, combinations of these (meth)acrylate ester monomers may also be used.

Such additional (meth)acrylate compounds are suitably utilized as diluents and as cured property modifiers. In preferred embodiments they are employed in an amount adjusted to provide a formulation viscosity of from 65,000 to 3,000,000 mPa·s, more preferably 150,000 to 1,000,000 mPa·s.

Liquid diluent monomers which are liquid esters, preferably acrylate and methacrylate esters having a viscosity of 100–5,000 cps (100–5,000 mPa·s), preferably 100–4,000 cps (100–4,000 mPa·s), more preferably 200–2,000 cps (200–2,000 mPa·s), are desirable to provide a satisfactory viscosity to the inventive compositions. Suitably, such (meth)acrylate monomers include mono, di, or poly(meth) acrylate compounds, examples of which are β-carboxyethyl acrylate, isobornyl acrylate, n-octyl acrylate, n-decyl acrylate, cyclohexyl acrylate, 2-ethylhexyl acrylate, ethoxyethoxyethyl acrylate, ethoxylated phenyl monoacrylate, hydroxyethyl acrylate, isooctyl acrylate, n-butyl acrylate, dipropylene glycol diacrylate, tetraethylene glycol diacrylate, 1,6-hexane diol diacrylate, tripropylene glycol diacrylate, glycerol triacrylate, trimethylol propane diacrylate, trimethylol propane triacrylate, pentaerythritol tetraacrylate, hydroxyethyl methacrylate, hydroxypropyl methacrylate, cyclohexyl methacrylate, glycerol monomethacrylate, glycerol 1,3-dimethacrylate, trimethyl cyclohexyl methacrylate, methyl triglycol methacrylate, and so forth. Some of these monomers may be found as viscosity or property modifiers in the commercial oligomer products. Mono-(meth)acrylate monomers are desirable. Preferred diluents include isobornyl acrylate, isodecyl acrylate, tetrahydrofuryl acrylate and ethoxyethoxyethyl acrylate, and mixtures thereof.

In general methacrylate monomers give harder scratch resistant films than acrylate monomers, but slow the cure rate. A mixture of acrylate and methacrylate monomers often achieve a satisfactory balance of formulation viscosity, cure speed and cured adhesive properties. Isobornyl acrylate is a particularly desirable monomer component as it has good low-color, low viscosity uncured properties, fast cure, relatively low shrinkage on curing and gives hard scratch and resistant films as compared to those obtained with methacrylate monomers alone. Additionally, the films also have good water resistance and adhesion characteristics. The diluent monomers are employed in an amount of about 5% to about 60% by weight of the composition, such as from about 10% to about 60% by weight of the composition. Desirable compositions employ mixtures of liquid acrylate or methacrylate diluents. For instance, desirable compositions might include 10–25% of a methacrylate ester diluent, such as hydroxyethyl methacrylate or hydroxypropyl methacrylate, and 5–25% of an acrylate ester diluent, such as isobornyl acrylate. Some compositions have from about 5% to about 25% by weight of the composition of a mixture of at least one acrylate and at least one methacrylate, such as about 10% to about 25% by weight of the composition of the blend.

Various adhesion promoters may be used in the curable formulations of the invention, particularly where the formulation is intended as an adhesive or coating. Adhesion promoters may include acid functional monomers such as acrylic acid or methacrylic acid, and silane adhesion promoters such as glycidoxypropyltrimethoxysilane, methacryloxypropyltrimethoxysilane, methacryloxypropyltriacetoxysilane, and acryloxypropyltrimethoxysilane, and various unsaturated nitrogen-containing compounds such as N,N'-dimethylacrylamide, acryloyl morpholine, and the adhesion promoters described in WO 00/40663, for instance N-methyl-N-vinyl acetamide, N-vinyl caprolactam, N-vinylphthalimide, and N-vinylpyrrolidone. Adhesion promoters may be used alone or in combination. The adhesion promoter or promoters may suitably be employed in the adhesive formulations of the invention in an amount from about 0.5% to about 30% by weight of the composition, more typically 1% to about 20% by weight, and particularly about 2% to about 10% by weight. Alternatively such adhesion promoters may be employed in primer compositions applied to one or both of the substrate layers before the inventive adhesives are applied and cured.

In the aspect of the invention where the curable formulations are curable through exposure to radiation in the electromagnetic spectrum, a photoinitiator component should also be included. The photoinitiators are active in the UV/visible range, approximately 250–850 nm, or some segment thereof. Examples of photoinitiators, which initiate under a free radical mechanism, include benzophenone, acetophenone, chlorinated acetophenone, dialkoxyacetophenones, dialkylhydroxyacetophenones, dialkylhydroxyacetophenone esters, benzoin, benzoin acetate, benzoin alkyl ethers, dimethoxybenzoin, dibenzylketone, benzoylcyclohexanol and other aromatic ketones, acyloxime esters, acylphosphine oxides, acylphosphonates, ketosulfides, dibenzoyldisulphides, diphenyldithiocarbonate and diphenyl(2,4,6-trimethylbenzoyl) phosphine oxide. The photoinitiators that may be used in the adhesive compositions of the present invention include photoinitiators available commercially from Ciba-Geigy Corp., Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl phosphine oxide and 2-hydroxy-2-methyl-1-phenyl-propan-1-one) and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); photoinitiators available commercially from Union Carbide Chemicals and Plastics Co. Inc., Danbury, Conn. under the "CYRACURE" tradename, such as "CYRACURE" UVI-6974 (mixed triaryl sulfonium hexafluoroantimonate salts) and UVI-6990 (mixed triaryl sulfonium hexafluorophosphate salts); and the visible light [blue] photoinitiators, dl-camphorquinone and "IRGACURE" 784DC. Of course, combinations of these materials may also be employed herein.

Photoinitiators particularly suitable for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173) and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium "IRGACURE" 784DC). LUCIRIN TPO, from BASF is another preferred photoinitiator. Typically, the photoinitiators will be employed in an amount of 0.5 to 10%, desirably 1 to 7% and more desirably 3–5% by weight of the composition.

Alternatively, the curable formulations of the present invention may be rendered curable anaerobically, when an anaerobic cure-inducing composition is included in the formulation, and the formulation is applied to a substrate that is then placed in an environment in which air is excluded.

Such an anaerobic cure-inducing composition useful in the present invention includes a variety of components, such as amines (including amine oxides, sulfonamides and triazines). A desirable composition to induce cure in accordance with the present invention includes saccharin, toluidines, such as N,N-diethyl-p-toluidine and N,N-dimethyl-o-toluidine, acetyl phenylhydrazine, and maleic acid. Of course, other materials known to induce anaerobic cure may also be included or substituted therefor. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich). Quinones, such as naphthoquinone and anthraquinone, may also be included to scavenge free radicals which may form.

The curable formulations of the invention may also be formulated for thermal initiation, using as thermal initiators for instance diacyl peroxides, such as benzoyl peroxide; peresters such as perbenzoates, percarboxylates, and peracetates; and azo compound such as 2-cyano-2-propylazoformamide, 2,2'-azo-bis-2-methyl propionitrile, 1,1'-azo-bis-cyclopentane nitrile, 1,1'-azo-bis-cyclohexane nitrile, 2,2'-azo-bis-cyclohexyl propionitrile, 2,2'-azo-bis-methyl-2-methyl propionate, azo-bis-(N,N'-diethyleneisobutyramidine), 1,1'-azo-bis-1-phenylethane and/or 1,1'-azo-bis-1-phenylpropane.

The curable formulations of the present invention may formulated as adhesives, coatings or sealants and may be used on a variety of different surfaces, including metallic surfaces, such as steel, aluminum, copper, gold, silver, and zinc bichromate. In addition, the present invention may be used on ordinarily difficult to bond to substrates, such as non-ferrous materials, plastics, silicon, ceramics and wood.

The present invention also provides methods of using the adhesives of the invention to bond substrates by applying the adhesive formulation to a substrate, optionally coated with a cure promoting or adhesion promoting primer, joining the substrates and then curing the adhesive. In addition, the present invention further provides articles manufactured with the inventive adhesive formulations.

The compositions of the invention may also include an inhibitor of polymerization in an amount effective to give desired shelf stability to the composition. Suitable inhibitors are well known to those skilled in the art and include those described in the aforementioned patents which described anaerobic compositions. Metal chelators, such as ethylenediamine tetraacetate ("EDTA") and 1-hydroxyethylidine-1,1-diphosphonic acid ("HEDPA"), and quinone type inhibitors, such as hydroquinone, methyl hydroquinone, napthaquinone and benzoquinone, are exemplary. Such inhibitors are typically employed at a level of 0.1–1.0% by weight of the composition.

The invention is illustrated by the following non-limiting examples.

EXAMPLES

General Procedure for Propoxylation of Hydrogenated Bisphenol A

Commercial grade HBPA, containing approximately 95% di hydroxy functionality and 3.5–5% monohydroxy functionality in several isomer forms was used in all examples. Mole ratios are based on equivalencies determined from measured hydroxyl numbers, the number of moles being calculated on the basis of the theoretical two equivalents OH per mole of HBPA.

HBPA was dried at 90° C. for 8 hrs in a rotary evaporator at a pressure of 10–15 mbar. The dried product was weighed into a 2 liter Paar reactor under dry nitrogen, together with a catalytic amount of potassium hydroxide (KOH) (0.25 weight % based on total reactant weight). The reactor was heated at 185° C. under nitrogen without mixing until the HBPA had fully melted. A nitrogen purge was then started with mixing at 1000 rpm and reactants at 175° C. After a 15 minute purge the nitrogen purge was shut off and the reactor was sealed.

Propylene oxide in a pressure pipette equipped with a nitrogen backflow check valve and pressurized to 50–100 psi was attached to the reactor and gradually added with stirring at between 500–1100 RPM using a gas dispersion turbine blade. Temperature was maintained in the range of about 175° C. to about 185° C. After the required amount of propylene oxide was added, stirring and temperature maintenance were continued for a time and the pressure was allowed to drop. When the pressure had dropped to about 25–50 psi, the reactor was vented. The reactor was then cooled to 80° C. Clay, MAGNESOL® Polysorb 30/40 (7 g per g KOH used) and CELITE® 503 (21 g per g KOH used), was added, mixed for 3 hrs at 80° C. and filtered through a 15 µm filter.

Examples 1–6

The general procedure was used, with the amount of propylene oxide relative to the HBPA charge being varied as follows:

| Example | moles PO per mole HBPA |
|---|---|
| 1 | 1 |
| 2 | 1.5 |
| 3 | 2 |
| 4 | 3 |
| 5 | 3.52 |
| 6 | 4.86, | the amount of KOH is adjusted to maintain a 0.25 wt. % ratio, and the amounts of clay were adjusted proportionately to the KOH weight.

In all cases the products are mixtures of unreacted HBPA and propoxylated adducts having various PO contents. PO content is therefore reported on the basis of the molar amount used in the reaction relative to the molar amount of HBPA used.

Product profiles are given in Table 1

TABLE 1

| Product | % Reacted HBPA | OH # | Viscosity mPa · s 25° C. | Viscosity mPa · s 80° C. |
|---|---|---|---|---|
| Starting HBPA | — | 452 | solid | solid |
| 1.0 PO (Ex 1) | 30.1 | 371 | 302500* | 1560 |
| 1.5 PO (Ex 2) | 52.4 | 340 | 2392500 | 592 |
| 2.0 PO (Ex 3) | 57.7 | 316 | 352000 | 298 |
| 3.0 PO (Ex 4) | 71.0 | 265 | 40300 | 133 |
| 3.53 PO (Ex 5) | 69.4 | 264 | 23125 | 113 |
| 4.86 PO (Ex 6) | 83.6 | nm | nm | nm | nm = not measured
*viscosity at 35° C.

Examples 7–9

Methacrylate urethane capped block polyurethane resins having the generalized structure:

MA–(Hard Segment–Soft Segment)$_y$–Hard Segment–MA where MA is methacryloxypropyl or acryloxypropyl, the Hard Segments are U—(HBPA(PO)$_n$—U)$_x$, U is a carbamato linked residue of a diisocyanate, HBPA(PO)$_n$ is a residue derived from propoxylated HBPA prepared substantially as in one of Examples 1–6, x and y have an average value of about 1 and the soft segments are residues of POLYMEG 2000, were prepared according to the following general procedure.

HBPA(PO)$_n$ (0.198 moles) isobornyl methacrylate (112.20 g), methacrylic acid (3.16 g), antioxidants BHT (0.33 g) and MEHQ (0.33 g) and dibutyltin dilaurate (DBTBL, 0.21 g) are added to a reaction flask and warmed to 75° C. under dry air. Isophorone diisocyanate 88.06 g, (0.396 moles) is added, causing the mixture to exotherm to 84° C. before cooling back to 75° C. The mixture is stirred at 75° C. for 1 hr and then titrated for NCO. POLYMEG 2000 (231.41 g (0.233 OH eq) is added with 0.21 g DBTDL and the mixture stirred for an additional 2 hrs at 75° C. Finally, 52.11 g hydroxyethyl methacrylate 96% (0.384 moles) is added with 0.21 g DBTDL and the mixture stirred for an additional 4 hrs at 75° C. IR shows no residual NCO. The product is a mixture containing approximately 6% unreacted hydroxyethyl methacrylate, approximately 20 % isobornyl methacrylate, and approximately 73% of a block resin as represented above.

For Example 7 the propoxylated HBPA was HBPA(PO)$_{1.5}$.

For Example 8 the propoxylated HBPA was HBPA(PO)$_{2.0}$.

For Example 9 the propoxylated HBPA was HBPA(PO)$_{3.0}$.

Example 10

The general procedure for Examples 7–9 was followed except that an equivalent amount of TDI (toluene diisocyanate) was used in place of IPDI. The propoxylated HBPA was HBPA(PO)$_{2.0}$.

Examples 11–13

The general procedure for Examples 7–9 was followed except that the 52.11 g hydroxyethyl methacrylate was replaced by 16.47 g (0.142 moles) of hydroxyethyl acrylate, 2 hrs after this addition 32.83 g (0.242 moles) hydroxyethyl methacrylate 96% was added and stirring was then continued for an additional 2 hrs.

For Example 11 the propoxylated HBPA was HBPA(PO)$_{1.5}$.

For Example 12 the propoxylated HBPA was HBPA(PO)$_{2.0}$.

For Example 13 the propoxylated HBPA was HBPA(PO)$_{3.0}$.

Comparative Example A

A resin product was prepared substantially as in Example 7 except that HBPA(PO)$_{1.5}$ was replaced by an equivalent amount of HBPA and the IPDI was replaced with an equivalent amount of TDI.

Comparative Example B

A resin product was prepared substantially as in Example 11 except that HBPA(PO)$_{1.5}$ was replaced by an equivalent amount of HBPA and the IPDI was replaced with an equivalent amount of TDI.

Formulations

Formulations were prepared by adding isobornyl acrylate (IBOA) to the respective resin products of Examples 7–13 and Comparative Examples A and B, on a weight basis of 32.5% IBOA, 67.5% resin product. 2% Lucerin™ TPO and 3% Irgacure™ 184 photoinitiator was then added in an amount of based on total formulation weight. The resulting formulations were cured using a Fusion Model HP6 with an H bulb to give a total cumulative dose of 2000 mJ/cm$^2$ and evaluated on an Instron™ universal testing machine for tensile modulus, tensile strength, and elongation properties. Storage and loss moduli and Tg were determined by DMA on a Rheometrics RD-2. Water absorption was determined by ASTM Test Method D-570-95. Average results are shown in Tables 2 and 3.

TABLE 2

Bulk Properties - Effect of Isocyanate

| Resin Example | 8 | 10 |
| --- | --- | --- |
| Isocyanate | IPDI | TDI |
| Propoxylated HBPA | HBPA(PO)$_{2.0}$ | HBPA(PO)$_{2.0}$ |
| Cap | Methacrylate | Methacrylate |
| Modulus (psi) | 55170 | 58960 |
| Tensile Strength psi | 3319 | 3345 |
| Elongation % | 217 | 220 |

These values are well within a standard deviation of each other and can be considered virtually identical. This indicates that the isocyanate had no effect on the bulk properties of the cured formulations.

TABLE 3

Bulk and DMA Properties, Effects of PO and End Capper Variation

| Resin Example | A | 7 | 8 | 9 | B | 11 | 12 | 13 |
| --- | --- | --- | --- | --- | --- | --- | --- | --- |
| Isocyanate | TDI | IPDI | IPDI | IPDI | TDI | IPDI | IPDI | IPDI |
| HBPA(PO)$_n$ n = | 0 | 1.5 | 2.0 | 3.0 | 0 | 1.5 | 2.0 | 3.0 |
| Cap | MA | MA | MA | MA | A | A | A | A |
| Tensile Modulus psi | 65030 | 65600 | 55170 | 48570 | 34360 | 34510 | 31040 | 23840 |
| Tensile Strength psi | 3486 | 3286 | 3319 | 3062 | 2556 | 2685 | 2773 | 2577 |
| Elongation % | 205 | 214 | 217 | 204 | 216 | 234 | 234 | 261 |
| DMA modulus @ 22.5° C. (× 10 E9) | 5.6 | 5.1 | 4.7 | 5.1 | 3.9 | 4.2 | 4.2 | 3.9 |
| Tg ° C. | 88.9 | 83.8 | 83.6 | 79.2 | 78.4 | 74.0 | 73.2 | 73.3 |
| Water Absorption % | 0.96 | 1.28 | 1.04 | 1.02 | 0.99 | 1.12 | 1.13 | 1.11 |

MA = methacrylate; A = acrylate

Table 3 demonstrates that the cured physical properties of compositions employing HBPA hard segment urethane acrylate resins are only very gradually changed with propoxylation of up to 3 moles of PO per mole of HBPA. Therefore the propoxylated products can be used effectively in applications where HBPA physical properties are desired.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims.

All published documents and all co-pending applications mentioned anywhere herein are expressly incorporated here by reference in their entirety.

What is claimed is:

1. A urethane (meth)acrylate resin, obtained by a process comprising a step of reacting a polyol component and a polyisocyanate component, wherein the polyol component comprises a first polyol which is an alkoxylate of an amorphous diol having a melting point above about 100° C.;

the alkoxylate is an adduct of propylene oxide, butylene oxide, a mixture of propylene oxide and butylene oxide or a mixture of one or both of propylene oxide and butylene oxide with up to 50 mole % of ethylene oxide;

the first polyol has an average of from about 1 to about 5 units of alkoxylate per mole of said amorphous diol; and the amorphous diol is hydrogenated dihydroxy naphthalenes or cyclohexane dimethanol.

2. A urethane (meth)acrylate resin, obtained by a process comprising a step of reacting a polyol component and a polyisocyanate component, wherein the polyol component comprises a first polyol which is an alkoxylate of an amorphous diol having a melting point above about 100° C.;

the alkoxylate is an adduct of propylene oxide, butylene oxide, a mixture of propylene oxide and butylene oxide or a mixture of one or both of propylene oxide and butylene oxide with up to 50 mole % of ethylene oxide, and the first polyol has an average of from about 1 to about 5 units of alkoxylate per mole of said amorphous diol, and the polyol component further comprises an oligomeric aliphatic diol or triol having a number average molecular weight of from 700 to about 5000.

3. A resin as in claim 2 wherein said oligomeric aliphatic diol or triol is a member of the group consisting of polyoxypropylene triols, poly(tetramethylene oxide) diols, polycaprolactone/ poly(tetramethylene oxide) diols and polycaprolactone diols.

4. A resin as in claim 2 wherein said amorphous diol is selected from the group consisting of hydrogenated bisphenol A, hydrogenated dihydroxy naphthalenes and cyclohexane dimethanol.

5. A resin as in claim 4 wherein said amorphous diol is hydrogenated bisphenol A.

6. A resin as in claim 2 wherein the alkoxylate is an adduct of propylene oxide.

7. A resin as in claim 2 wherein the first polyol has an average of from 1.5 to 4 units of alkoxylate per mole of said amorphous diol.

8. A resin as in claim 7 wherein the first polyol has an average of from about 2 to about 3 units of alkoxylate per mole of said amorphous diol.

9. A resin as in claim 2 wherein the (meth)acrylate groups thereof are provided by reaction of isocyanate groups of said polyisocyanate with a hydroxyalkyl (meth)acrylate.

10. A resin as in claim 9 wherein the hydroxyalkyl(meth) acrylate is selected from the group consisting of hydroxyethyl methacrylate, hydroxypropyl methacrylate, hydroxyethyl acrylate and hydroxypropyl acrylate.

11. A resin as in claim 2 wherein the polyisocyanate is selected from the group consisting of isophorone diisocyanate and toluene diisocyanate.

12. A free-radically curable composition comprising a resin as in claim 2.

13. A composition as in claim 12 further comprising a free-radical initiator.

14. A composition as in claim 12 comprising first and second parts adapted to cure upon contacting each other, the first part comprising an initiator compound which generates free-radicals upon activation and the second part a compound which activates said initiator compound when brought into contact with the initiator compound.

15. A composition as in claim 12 further comprising a photoinitiator.

16. A cured product of a composition as in claim 12.

17. An assembly comprising a pair of substrates bonded by a cured product as in claim 16.

18. A block urethane acrylate resin comprising hard and soft urethane segments and urethane (meth)acrylate capped ends, wherein the hard segment comprises residue of a first polyol and a polyisocyanate and the soft segment comprises residue of a second polyol, the first polyol is an alkoxylate of an amorphous diol having a melting point above about 100° C., the alkoxylate is an adduct of propylene oxide, butylene oxide, a mixture of propylene oxide and butylene oxide or a mixture of one or both of propylene oxide and butylene oxide with up to 50 mole % of ethylene oxide, and the first polyol has an average of from about 1 to about 5 units of alkoxylate per mole of said amorphous diol.

19. A block urethane acrylate resin as in claim 18 wherein the second polyol is an oligomeric aliphatic diol or triol having a number average molecular weight of from 700 to about 5000.

20. A block urethane acrylate resin as in claim 19 wherein said oligomeric aliphatic diol or triol is a member of the group consisting of polyoxypropylene triols, poly (tetramethylene oxide) diols, polycaprolactone/poly (tetramethylene oxide) diols and polycaprolactone diols.

21. A block urethane acrylate resin as in claim 18 wherein said amorphous diol is selected from the group consisting of hydrogenated bisphenol A, hydrogenated dihydroxy naphthalenes and cyclohexane dimethanol.

22. A block urethane acrylate resin as in claim 21 wherein said amorphous diol is hydrogenated bisphenol A.

23. A block urethane acrylate resin as in claim 18 wherein the alkoxylate is an adduct of propylene oxide.

24. A block urethane acrylate resin as in claim 18 wherein the first polyol has an average of from 1.5 to 4 units of alkoxylate per mole of said amorphous diol.

25. A curable formulation comprising a block urethane acrylate resin as in claim 18 and at least one other (meth) acrylate ester compound.

26. A free-radically curable composition comprising a block urethane acrylate resin as in claim 18.

27. A composition as in claim 26 further comprising a free-radical initiator.

\* \* \* \* \*